United States Patent [19]

Slaton

[11] 3,774,944
[45] Nov. 27, 1973

[54] CONDUIT JOINT CONSTRUCTION
[75] Inventor: Stewart E. Slaton, Lighthouse Point, Fla.
[73] Assignee: Utility Precasters, Inc., Kansas City, Mo.
[22] Filed: Oct. 15, 1971
[21] Appl. No.: 189,716

[52] U.S. Cl............. 285/137 R, 285/230, 285/231, 285/235
[51] Int. Cl............................................. F16l 39/00
[58] Field of Search................. 285/137, 230, 235, 285/236, 294, 297

[56] References Cited
UNITED STATES PATENTS

| 3,606,395 | 9/1971 | Salerno et al.................. 285/137 R |
| 351,193 | 10/1886 | McCracken..................... 285/294 X |
| 3,574,356 | 4/1971 | Salerno....................... 285/137 R X |
| 3,516,693 | 6/1970 | Glover............................... 285/235 |
| 1,881,913 | 10/1932 | Parker............................ 285/137 R |
| 3,163,448 | 12/1964 | Franklin........................ 285/137 R |
| 3,469,863 | 9/1969 | Riester et al.................... 285/137 R |

FOREIGN PATENTS OR APPLICATIONS
13,718  /1892  Great Britain...................... 285/294

Primary Examiner—James R. Boler
Assistant Examiner—Wayne L. Shedd
Attorney—Fishburn, Gold & Litman

[57] ABSTRACT

Concrete conduit sections have embedded liner tubes projecting into cavities formed in the ends of the sections. Aligned tubes in adjacent sections are joined by a sleeve which receives the tubes into tapered ends. The sleeve ends are sealed against a conduit section wall by a resilient collar and reinforcing bars extend through the cavities and into overlapping relation. The entire joint structure is secured by a sealer poured into the abutting sections.

4 Claims, 4 Drawing Figures

INVENTOR.
Stewart E. Slaton
BY
Fishburn, Gold & Litman
ATTORNEYS

INVENTOR.
Stewart E. Slaton
BY
Fishburn, Gold & Litman
ATTORNEYS

CONDUIT JOINT CONSTRUCTION

OBJECTS OF THE INVENTION

This invention relates to improvements in buried conduit and particularly joined concrete conduit sections having multiple passageways with smooth liners for electric wires and the like.

Many conduit configurations for containing electric wires have been suggested; however, all have exhibited certain disadvantages either in the construction of the sections, the forming of joints between sections, or the maintenance of a proper seal within closed conduit. Such disadvantages are overcome or substantially alleviated by the conduit construction of this invention.

The principal objects of the present invention are: to provide superior conduit sections which are relatively simple and inexpensive to manufacture; to provide such sections having duct liners suitable for drawing electric wires therethrough with a minimum of abrasion; to provide a conduit joint construction which is simple to produce in the field and yet strong and secure under adverse conditions; and to provide such a conduit joint arrangement which avoids the introduction of foreign material into ducts during joint sealing.

Other objects and advantages of this invention will become apparent from the following description taken in connection with the accompanying drawings wherein are set forth by way of illustration and example certain embodiments of this invention.

Figure 1:
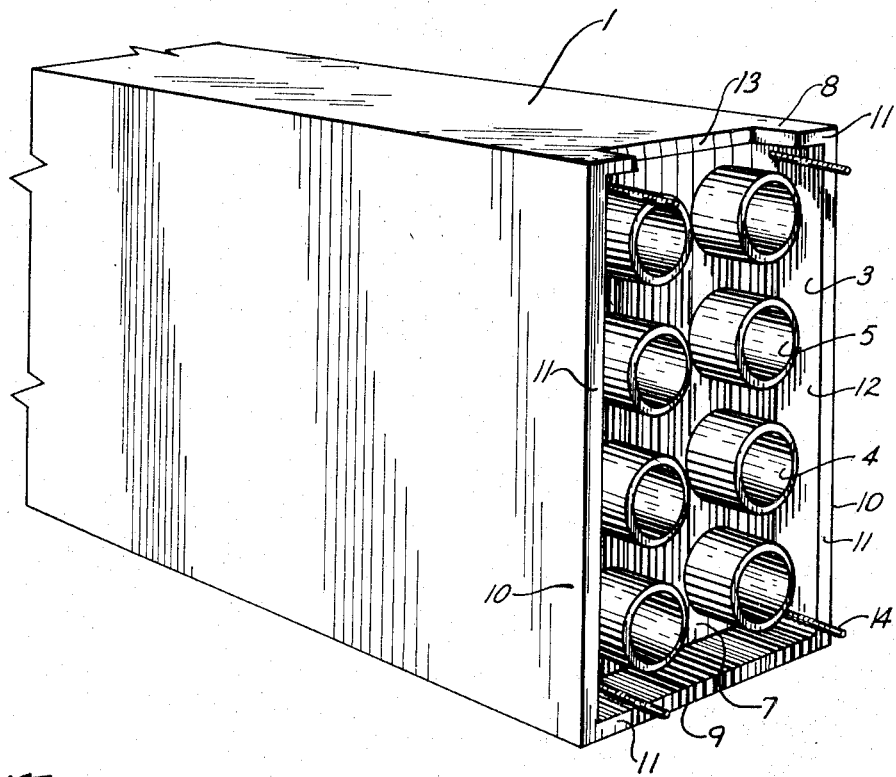
FIG. 1 is a fragmentary perspective view showing the open end of a conduit section.

Referring to the drawings in more detail:

The reference numerals 1 and 2 indicate respectively first and second elongated, generally horizontal concrete conduit sections. The sections 1 and 2 each have an end portion 3 and a plurality of plastic conduit tubes 4, in this example eight in number. However, any suitable number of tubes 4 may be utilized. The tubes 4 have a smooth interior surface 5 suitable for drawing electric cable (not shown) therethrough with a minimum of friction and abrasion. The tubes 4 are secured within the respective conduit sections 1 and 2, preferably by being molded within the concrete body 6 of the sections during formation thereof, and extend longitudinally therethrough in substantially parallel relation.

Figure 2:
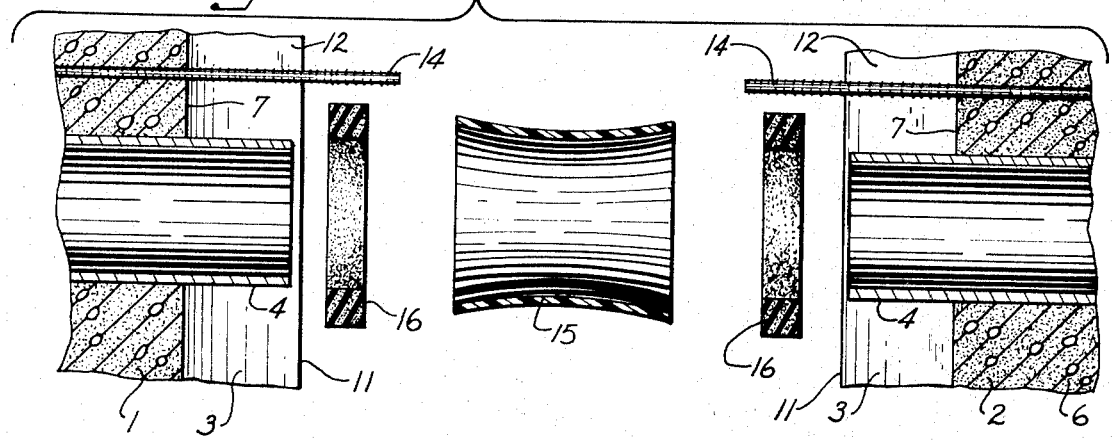
FIG. 2 is a cross-sectional, fragmentary, exploded view showing joint parts and portions of first and second conduit sections in opposed relation for joint formation.
Figure 3:
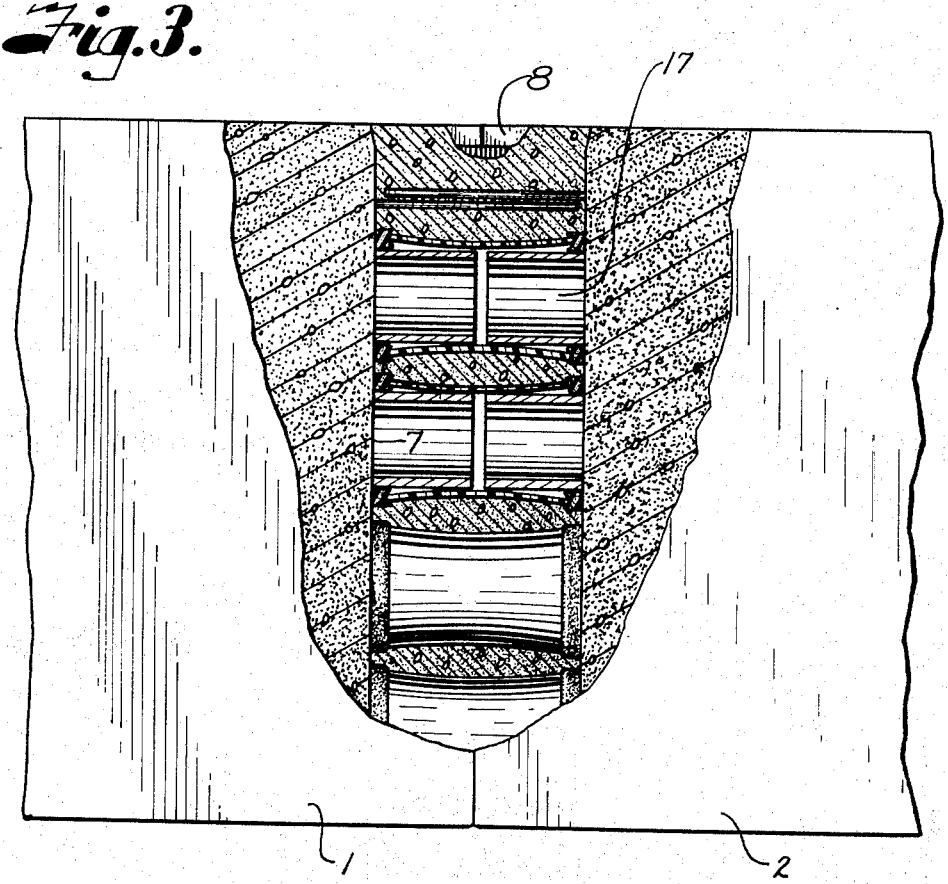
FIG. 3 is a fragmentary side elevation with a portion broken away showing a completed conduit joint.
Figure 4:
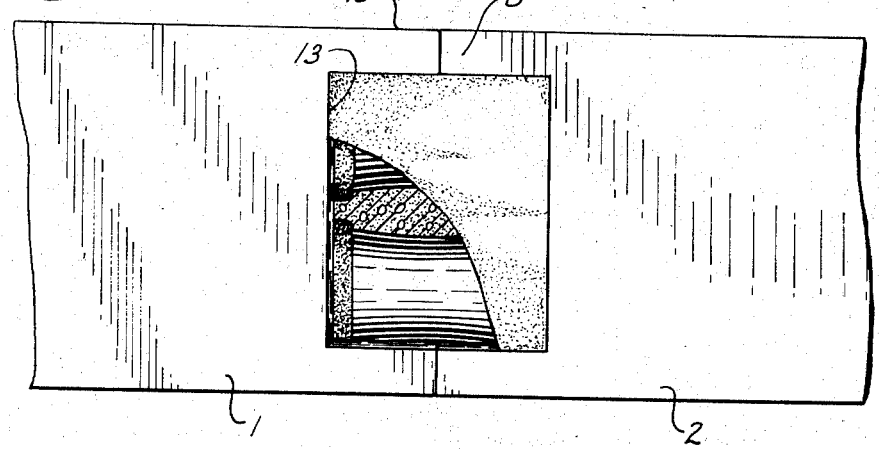
FIG. 4 is a fragmentary plan view of the conduit joint of FIG. 3.

Each of the conduit section end portions 3 have an upwardly extending end wall 7 and upper, lower and side peripheral walls 8, 9 and 10 respectively. The peripheral walls 8, 9, and 10 have connecting end edges 11 projecting horizontally beyond the end wall 7 whereby the end wall 7 and peripheral walls 8, 9, and 10 define a large depression or cavity 12. The conduit tubes 4 project through and longitudinally beyond the respective end wall 7 and into the respective cavity 12, but terminate short of the peripheral wall end edges 11, as best shown in FIG. 2.

The upper peripheral wall 8 in at least one of the conduit sections 1 and 2 has a recess, opening or slot 13 therethrough forming a pouring opening as noted further hereinafter. A plurality of steel reinforcing bars 14 are securely embedded in the respective conduit sections 1 and 2 and project through the end walls 7. The bars 14 extend through the cavity 12, and beyond the peripheral wall and edges 11, as best shown in FIG. 2.

Additional parts used in the conduit joint construction comprise a sleeve 15, of a suitable semi-resilient material, tapering outwardly at each end thereof to an inside diameter somewhat larger than the outside diameter of the respective conduit tubes 4. Also used are collar rings 16, preferably of a soft sponge-like substance, having an inside diameter substantially equal to the outside diameter of the tubes 4.

In constructing a conduit joint, the conduit sections 1 and 2 are placed in opposed relation with a major portion of the respective opposed peripheral wall end edges 11 in contact and the respective conduit tubes 4 axially aligned in pairs. When the conduit sections are so located with respect to ach other, the reinforcing bars substantially overlap within the opposed and then contiguous cavities 12.

Prior to urging the conduit end portions together, the respective sleeves 15 are positioned so that opposed conduit tubes 4 are received thereinto, producing an enclosed passageway 17 therebetween. Prior to producing the above relationship, the collar rings 16 are placed over the respective ends of the conduit tubes 4 so that the collar rings respectively engage and seal against an end wall 7 and one end of the respective sleeve 15.

A pourable, high strength sealing filler, such as a suitable concrete formulation, is then poured through the opening 13, producing a permanent moisture-proof and physically strong joint between the conduit sections without danger of the sealing and joining material entering and contaminating the interior of the conduit passageways.

It is to be understood that although one form of this invention has been illustrated and described, it is not to be limited thereto except insofar as such limitations are included in the following claims.

What I claim and desire to secure by Letters Patent is:

1. Conduit joint construction comprising:
   a. first and second elongated, generally horizontal concrete conduit sections, each having an end portion and a plurality of conduit tubes,
   b. said conduit tubes being secured within said respective conduit sections and extending longitudinally therethrough in generally parallel relation,
   c. each of said conduit section end portions having an upwardly extending end wall and upper, lower and side peripheral walls with end edges projecting longitudinally beyond said end wall, said end wall and peripheral walls defining a cavity, said conduit tubes projecting through and longitudinally beyond said end wall and into said cavity but terminating short of said peripheral wall end edges,
   d. at least one of said upper peripheral walls having a pouring opening formed therein,
   e. a plurality of reinforcing bars embedded in said sections and projecting through said end walls and cavity and beyond said peripheral wall end edges,
   f. said conduit sections being in opposed relation with a major portion of said respective peripheral wall end edges in contact and said respective conduit tubes being axially aligned in pairs, said reinforcing bars overlapping within opposed contiguous cavities, g. a sleeve tapering outwardly at each end for each of said conduit tube pairs, said sleeve receiving opposed tubes thereinto and producing an enclosed passageway therebetween, a resilient collar ring surrounding each of said tubes and sealingly engaging the end wall of said respective conduit and the respective end of said sleeve, and h. a poured hardened filler substantially filling said cavities and producing a sealed joint between said conduit sections.

2. Conduit joint construction comprising:

a. first and second elongated and generally horizontal concrete conduit sections each having an end portion including an end wall;

b. said end portions each including peripheral wall means extending beyond the end wall of each of said first and second conduit sections, each of said peripheral wall means having an end edge adapted to contact an end edge of the other peripheral wall means when said conduit sections are in opposed relation thereby defining a cavity between said end walls and peripheral wall means;

c. a plurality of conduit tubes secured in each of said conduit sections and extending longitudinally therethrough in generally parallel relation and projecting through and longitudinally beyond said respective end wall and into the cavity and terminating short of said respective end edges, said respective conduit tubes being axially aligned in pairs when said conduit sections are in opposed relation;

d. edges on at least one of said peripheral wall means defining a pouring opening communicating with the cavity;

e. a plurality of reinforcing bars embedded in each of said conduit sections and projecting through said respective end walls and beyond said respective end edges, said reinforcing bars of said first and second conduit sections overlapping within opposed contiguous cavities;

f. a plurality of resilient collar rings each surrounding a respective one of said conduit tubes and sealingly engaging the end wall of said respective conduit section;

g. a plurality of sleeves each having outwardly tapering ends to receive therein a respective one of the conduit tubes of a respective pair of axially aligned tubes, each end of each of said sleeves sealingly engaging a respective one of said resilient collar rings thereby producing an enclosed passageway between said respective pair of axially aligned tubes; and h. a poured hardened filler substantially filling said cavities and producing a sealed joint between said conduit sections.

3. Conduit joint construction comprising:

a. first and second elongated conduit sections each having an end wall;

b. a respective peripheral wall extending beyond the end wall of each of said first and second conduit sections, each of said peripheral walls having an end edge adapted to be aligned with an end edge of the other peripheral wall when said conduit sections are in opposed relation thereby defining a cavity between said end walls and said peripheral walls;

c. a plurality of conduit tubes secured in each of said conduit sections and extending longitudinally therethrough in generally parallel relation and having end portions projecting through and longitudinally beyond said respective end wall and into the cavity but terminating short of said peripheral wall end edges, said respective conduit tube end portions being axially aligned in pairs when said conduit sections are in opposed relation;

d. a resilient collar ring surrounding each of said conduit tube end portions;

e. a plurality of sleeves each having a center portion and outwardly tapering end portions and receiving a pair of said axially aigned tube end portions thereinto, said collar ring sealingly engaging said conduit tube end portion and said sleeve end portion thereby producing an enclosed and sealed passageway between a respective pair of axially aligned conduit tubes; and f. a poured hardened filler substantially surrounding said sleeves and filling said cavities and producing a sealed joint between said conduit sections.

4. In a conduit joint construction wherein aligned first and second conduit sections each have an end wall and a plurality of conduit tubes secured in said conduit sections and having end portions projecting through and longitudinally beyond said end walls in aligned pairs;

a. peripheral wall means integral with at least one of said conduit sections and at least partially defining a cavity between said end walls containing said tube end portion pairs; said tube end portion pairs terminating in axially spaced relation;

b. a resilient collar ring surrounding each of said tube end portions;

c. a plurality of sleeves each having a center portion and outwardly tapering end portions, said sleeve end portions being radially spaced from said tube end portions and receiving said tube end portions thereinto;

d. said collar ring sealingly engaging said conduit tube end portion and said sleeve end portion, thereby producing an enclosed and sealed passageway between a pair of conduit tubes.

* * * * *